(12) United States Patent
Giacobbe

(10) Patent No.: US 6,884,059 B2
(45) Date of Patent: Apr. 26, 2005

(54) ELECTRICALLY ACTUATED BLOW-MOULDING MACHINE

(75) Inventor: Ferruccio Giacobbe, Monza (IT)

(73) Assignee: Magic MP S.p.A., Seregno (IT)

( * ) Notice: Subject to any disclaimer, the term of this patent is extended or adjusted under 35 U.S.C. 154(b) by 130 days.

(21) Appl. No.: 10/262,917

(22) Filed: Oct. 2, 2002

(65) Prior Publication Data

US 2003/0077352 A1 Apr. 24, 2003

(30) Foreign Application Priority Data

Oct. 24, 2001 (IT) .................................... MI2001A2230

(51) Int. Cl.[7] .............................................. B29C 49/56
(52) U.S. Cl. ................ 425/192 R; 425/182; 425/451.9; 425/541
(58) Field of Search .............................. 425/541, 451.9, 425/182, 192 R, 195

(56) References Cited

U.S. PATENT DOCUMENTS

| | | | | |
|---|---|---|---|---|
| 3,749,541 A | * | 7/1973 | Mehnert | ..................... 425/541 |
| 3,883,286 A | | 5/1975 | Kinslow et al. | |
| 4,421,472 A | * | 12/1983 | Martin, Jr. | ............... 425/450.1 |
| 5,368,462 A | * | 11/1994 | Kiefer et al. | ................ 425/541 |
| 5,478,229 A | * | 12/1995 | Kato et al. | .................. 425/541 |
| 6,102,685 A | * | 8/2000 | Miura et al. | ................. 425/541 |

FOREIGN PATENT DOCUMENTS

| | | | |
|---|---|---|---|
| DE | 4223314 A1 | 1/1994 | |
| EP | 0913244 A1 | 5/1999 | |
| EP | 1060865 A2 | 12/2000 | |
| JP | 06000869 | 1/1994 | |
| JP | 07032366 | 2/1995 | |
| JP | 11286043 | 10/1999 | |
| JP | 11286043 A | * 10/1999 | ........... B29C/49/32 |

OTHER PUBLICATIONS

Partial English machine translation of JP 11–286043A obtained from the JPO website, no date.*

* cited by examiner

*Primary Examiner*—Robert B. Davis
(74) *Attorney, Agent, or Firm*—Timothy J Keefer; Seyfarth Shaw LLP

(57) ABSTRACT

Machine for moulding containers (3a) made of plastic material, comprising an assembly (2) for extruding tubes (3) of plastic material, a blowing assembly (5), a mould for containing containers (3a), formed by two half-moulds (4a, 4b) movable upon actuation of associated first means (100), in a longitudinal direction (X—X) and symmetrically with respect to a fixed axis (Z—Z) perpendicular to said longitudinal direction, the assembly formed by the mould (4) and the associated first actuating means (100) being movable, upon actuation of second actuating means (200), in a transverse direction (Y—Y) from a position corresponding to the extrusion assembly to a position corresponding to the blowing assembly and vice versa, wherein said first means for actuation in the longitudinal direction are of the electric type and means (110) for symmetrically adjusting the distance of the two half-moulds (4a, 4b) from said fixed axis (Z—Z) are provided.

18 Claims, 4 Drawing Sheets

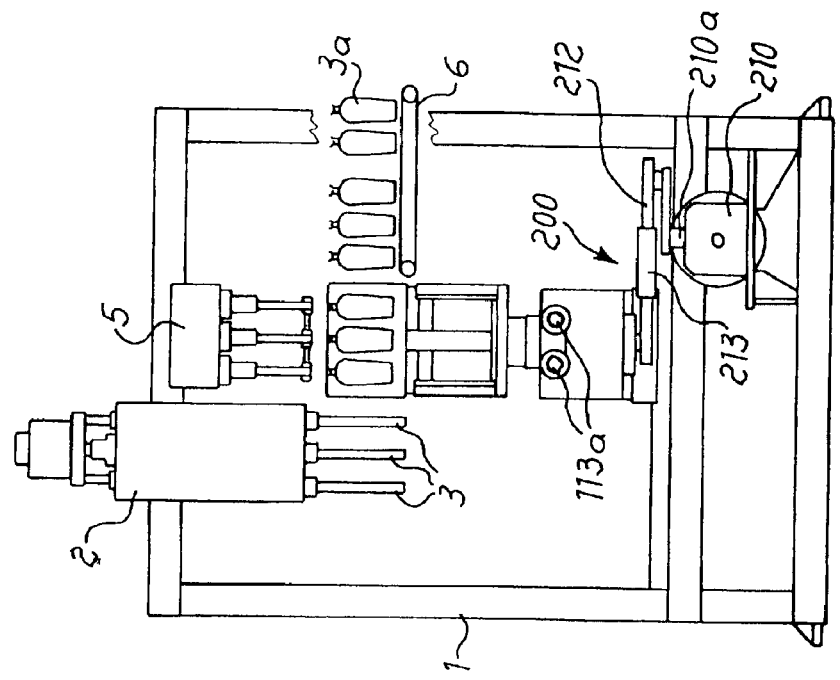
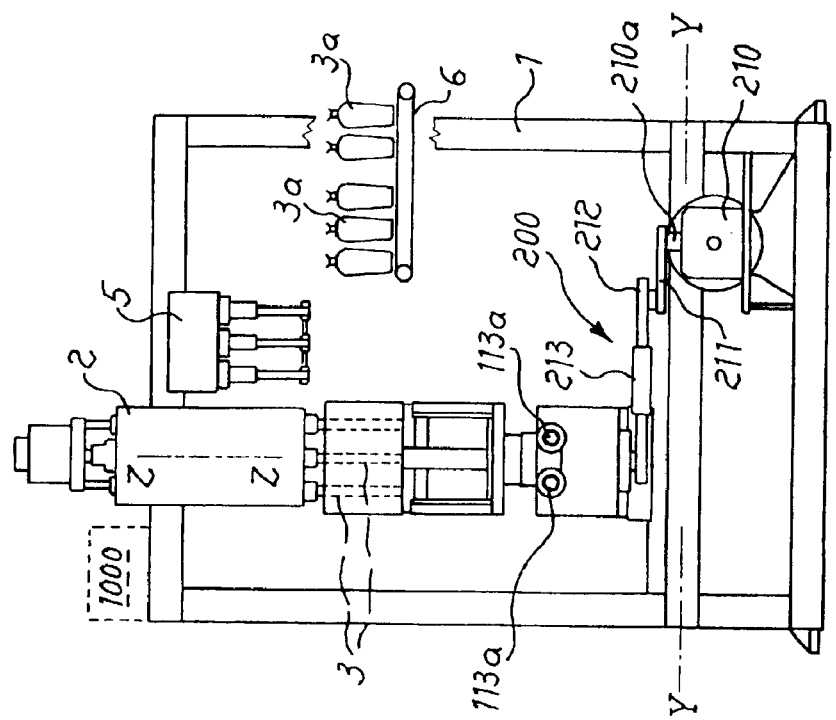

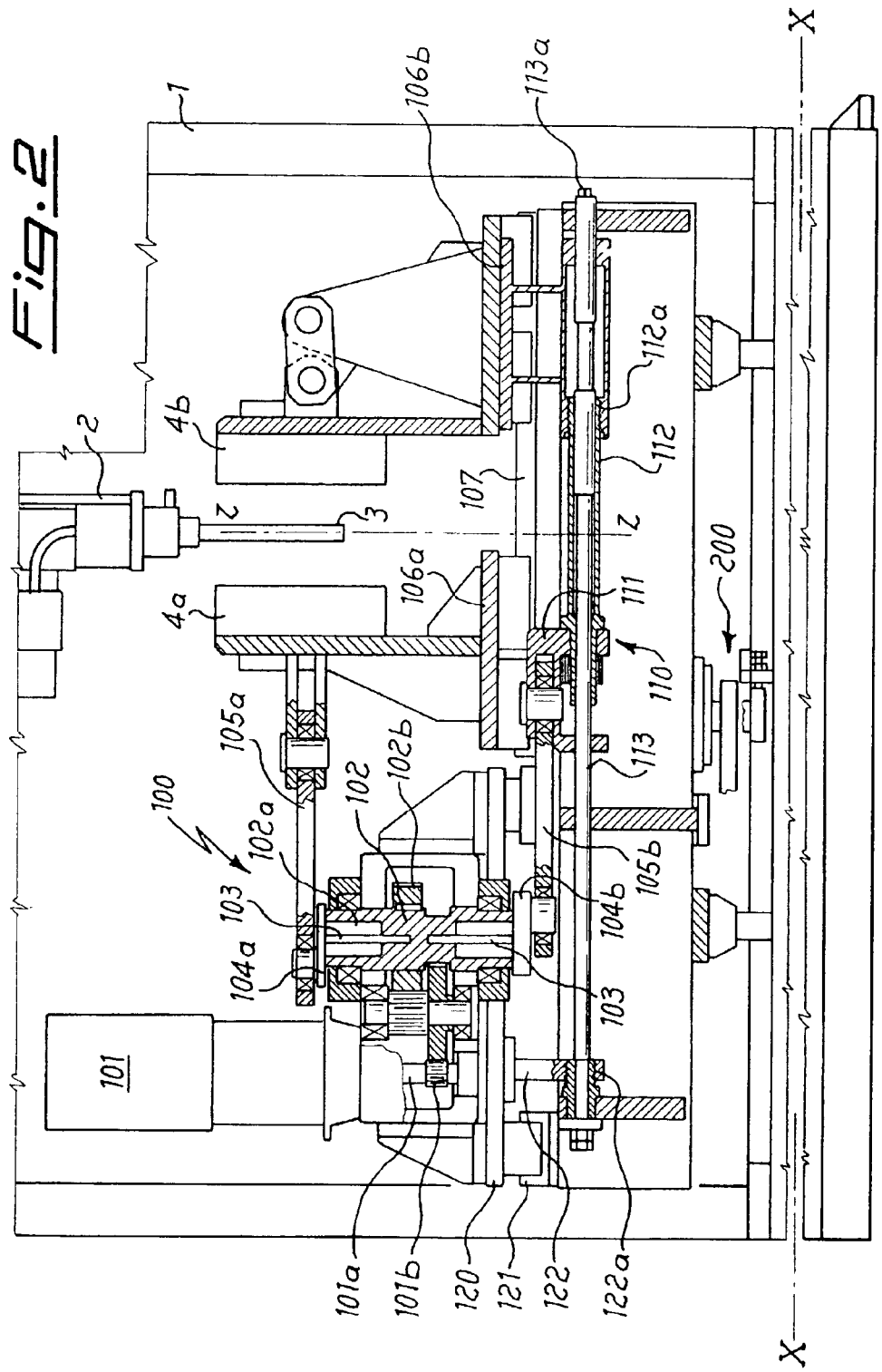

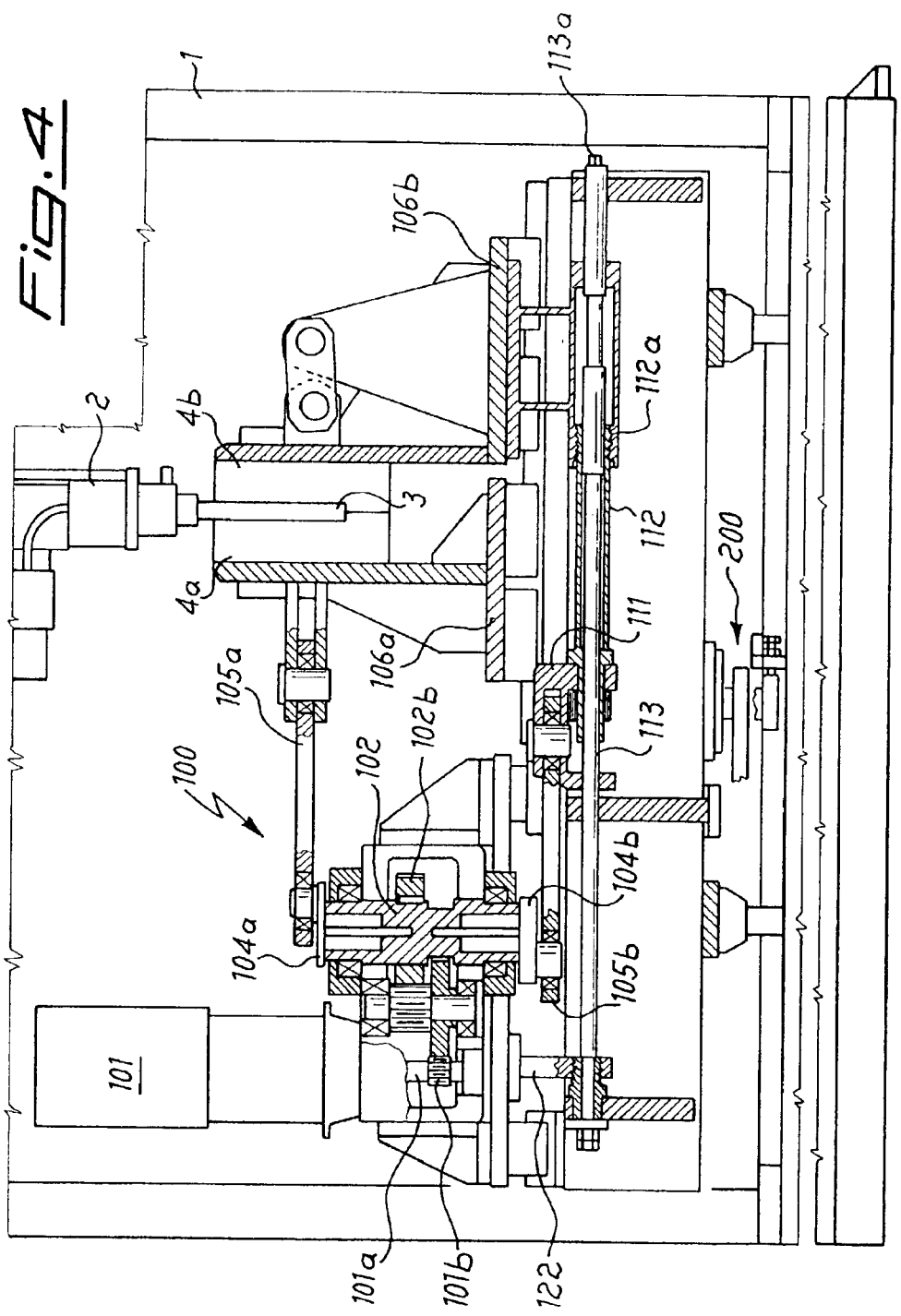

ELECTRICALLY ACTUATED BLOW-MOULDING MACHINE

FIELD OF THE INVENTION

The present invention relates to a machine for blowing plastic containers, with electric means for moving the mould.

DESCRIPTION OF RELATED ART

It is known in the technical sector relating to the packaging of liquid products and the like that there exists the need to manufacture containers made of plastic material suitable for this purpose.

It is also known that said containers are formed in suitable blow-moulding machines provided with associated moulds (formed by two movable half-moulds) into which a tube of plastic material extruded upstream is introduced.

These machines envisage the use of oil-hydraulic members for movement of the various movable parts and, although they perform their intended function, they have certain drawbacks essentially arising from the contamination which the pressurised oil inevitably causes in the surrounding environment and on the various parts of the machine, thereby making the latter unsuitable for use in the pharmaceutical and/or food industry.

The technical problem which is posed, therefore, is that of providing a machine for blowing plastic containers which does not cause contamination of the various parts of the machine and the surrounding environment.

Within the scope of this problem a further requirement is that the machine should ensure the possibility of adjusting in a precise and simple manner the distance of the two half-moulds with respect to a reference axis of symmetry, in order to ensure precision in closing of the mould and a constant closing force thereof, also upon variation in the thickness of the two half-moulds in relation to the container models to be blown.

SUMMARY OF THE INVENTION

These technical problems are solved according to the present invention by a machine for moulding containers made of plastic material, comprising an assembly for extruding tubes of plastic material, a blowing assembly, a mould for containing containers, formed by two half-moulds movable, upon actuation of associated first means, in a longitudinal direction and symmetrically with respect to a fixed axis perpendicular to said longitudinal direction, the assembly formed by the mould and the associated first actuating means being movable, upon actuation of second actuating means, in a transverse direction from a position corresponding to the extrusion assembly to a position corresponding to the blowing assembly and vice versa, wherein said first means for actuation in the longitudinal direction are of the electric type and means for symmetrically adjusting the distance of the two half-moulds from said fixed axis are provided.

BRIEF DESCRIPTION OF THE DRAWINGS

Further details may be obtained from the following description of a non-limiting example of embodiment of the invention, provided with reference to the accompanying plates of drawings in which:

FIG. 1 shows a schematic front view of the machine according to the invention during pick-up of the extruded tubes;

FIG. 2 shows a partially sectioned side view of the machine according to FIG. 1;

FIG. 3 shows a schematic front view of the machine according to the invention during moulding;

FIG. 4 shows a partially sectioned side view of the machine according to FIG. 3;

DETAILED DESCRIPTION OF THE INVENTION

Figure 5:
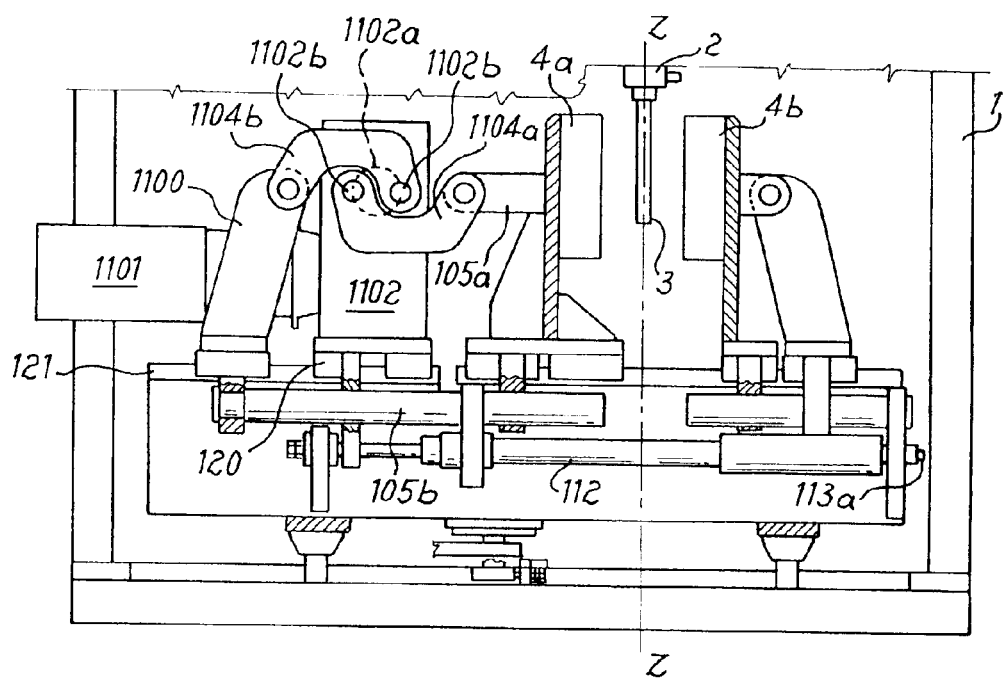
FIG. 5 shows a partially sectioned side view of a further embodiment of the machine according to the invention in the condition with the mould open.

Referring to FIG. 1, the machine according to the invention comprises a support frame 1 which has, constrained thereto, the means 2 for extrusion of the tube 3 of plastic material, the means 100 for moving the mould 4 in the longitudinal direction X—X, the means 200 for moving the mould 4 in the transverse direction Y—Y, the blowing nozzles 5 and the means 6 for removal of the moulded containers 3a.

Said mould 4 is formed by two half-moulds 4a, 4b symmetrically arranged with respect to a fixed reference axis of symmetry Z—Z.

Referring to FIG. 2, in greater detail, said means 100 for performing movement in the longitudinal direction comprise an electric motor 101 which is arranged parallel to the axis Z—Z and the shaft 101a of which carries a gear 101b suitable for engagement with a corresponding toothed wheel 102b mounted on a shaped sleeve 102 in turn arranged parallel to the axis Z—Z.

The sleeve 102 has suitable opposite and externally open seats 102a which receive internally respective spindles 103 having, mounted at their free end, the small end of a respective connecting rod 104a, 104b, the big end of which is pivotably mounted on one end of a respective rod 105a, 105b.

Whereas the upper rod 105a is directly constrained to the carriage 106a supporting the half-mould 4a and sliding on a rail 107, the lower rod 105b is connected to the carriage 106b supporting the half-mould 4b and sliding on the said rail 107 by means of the arrangement, in between, of a device 110 for adjusting the distance of the two half-moulds with respect to the fixed axis of symmetry Z—Z.

Said adjustment device 110 comprises a bracket 111 to which the other free end of the rod 105b is fastened; the bracket 111 is in turn connected to one end of a sleeve 112, the other end of which is constrained to the base of the carriage 106b of the half-mould 4b by means of a screw/internal thread coupling 112a.

The sleeve 112 has passing through it a splined shaft 113 extending parallel to the longitudinal axis of the machine.

The rear end of the splined shaft 113 is provided with a screw/internal thread coupling 122a connecting the splined shaft itself and a support 122 in turn joined to a slide 120 movable on longitudinal rails 121, which slide carries all of the part of the actuating assembly 100 formed by the kinematic chain comprising motor 101 and rods 105a, 105b.

The pitch of the front screw/internal thread coupling 112a is double the pitch of the rear screw/internal thread coupling 112a and the two couplings operate in the opposite sense to each other so as to ensure the correct relative displacement of the two carriages 106a, 106b, as will appear more clearly below.

At the front end of the splined shaft 113a hexagonal member 113a is provided for actuation of the said shaft by suitable means (not shown).

Referring to FIGS. 2 and 4, the movement, in a longitudinal direction, of the mould occurs as follows:

with the machine stopped and depending on the thickness of the mould 4 in the longitudinal direction, the front hexagonal member 113a is operated, rotating it in either direction in order to determine:

both rotation of the front coupling 112a in one direction or the other with consequent displacement of the carriage 106b away from/towards the axis Z—Z;

and rotation, in the opposite direction and with a halved pitch, of the rear coupling 122a so as to cause displacement of the slide 120 and therefore the carriage 106a by an identical amount towards/away from said axis Z—Z;

thus providing the correct relative position of the two half-moulds 4a, 4b for a perfect closing action following actuation by the motor 101.

Actuation by motor 101 to close the mould is performed as follows:

Referring to FIGS. 1, 2 and 4, in a co-ordinated and controlled sequence by suitable programming and control means 1000;

the motor 101 is actuated (FIGS. 1, 2) so as to cause a rotation of the upper connecting rod 104a and the lower connecting rod 104b, such that the carriage 106a and the carriage 106b are respectively pushed and pulled away symmetrically from the axis Z—Z so as to cause opening of the two half-moulds 4a, 4b.

the entire mould-carrying assembly 4 is positioned underneath the extruded tubes 3 of plastic material by means of the actuating means 200;

the motor 101 is operated in the opposite direction to the previous direction so as to cause counter-rotation of the two connecting rods 104a, 104b so that the carriage 106a and the carriage 106b are respectively pushed and pulled towards the axis of symmetry Z—Z in order to cause closing of the two half-moulds 4a, 4b around the tubes 3;

the devices 200 for performing displacement in the transverse direction Y—Y are actuated so as to cause displacement of the said assembly underneath the blowing station 5 where moulding of the containers is performed;

the actuating assembly 100 is actuated again in the longitudinal direction so as to cause opening of the two half-moulds 4a, 4b and allow discharging of the moulded containers 3a by associated evacuation means 6 and resumption of the cycle described above.

Referring to FIGS. 1 and 3, the devices 200 for displacement of the moulding assembly in the transverse direction Y—Y consist of a motor-reducer unit 210, the shaft 210a of which supports the small end of a connecting rod 211, the big end of which is pivotably mounted on the first end of a rod 212, the other end of which is pivotably mounted on the mould-support assembly.

In a preferred embodiment the rod 212 is interrupted and its continuity is ensured by a sleeved joint 213, the ends of which are coupled to the respective rod portions 212 by means of a screw/internal thread coupling operating in the opposite sense.

In this way, rotating said sleeved joint 213 produces a precise adjustment in the length of the rod 212 which ensures correct operation thereof depending on the dimensions envisaged.

Although the description has been provided in relation to single elements visible in the figures, it is envisaged in a preferred embodiment that the connecting rods, the rods, the splined shafts and the associated accessories may be duplicated so as to ensure an improved alignment and supporting and actuating capacity using elements which, although greater in number, may nevertheless be made with smaller dimensions which comply with normal production standards.

It is therefore obvious how, with the machine according to the invention, it is possible to perform opening/closing of the half-moulds with a constant force and independently of the thickness, in the longitudinal direction, of the said half-moulds, ensuring at the same time hygienic conditions of the machine and the surrounding environment.

Figure 6:
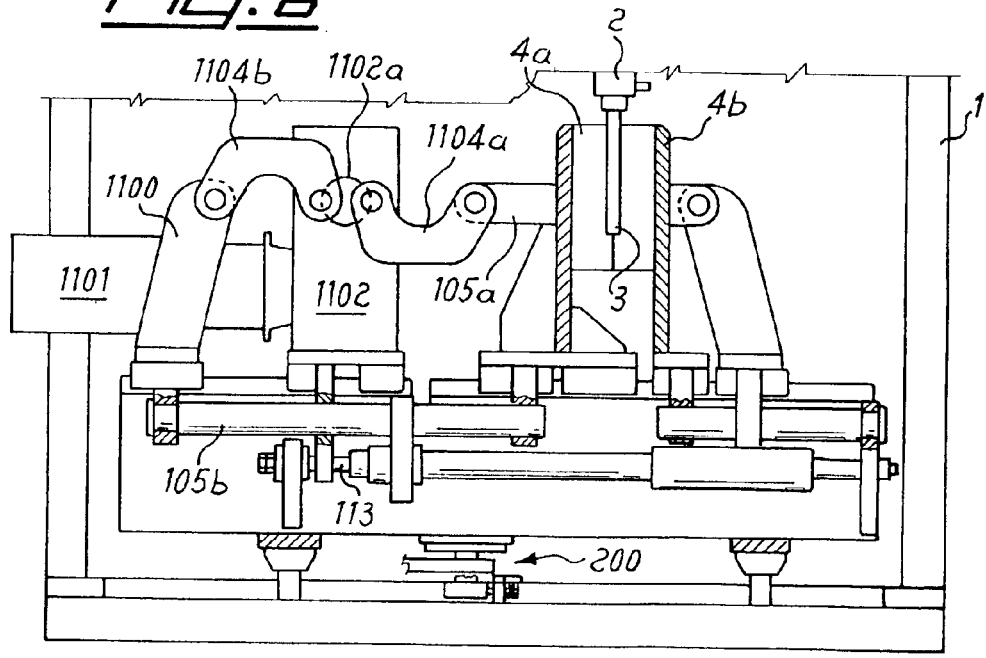
FIG. 6 shows a view similar to that of FIG. 5 with the mould closed.

FIGS. 5 and 6 show a second embodiment of the machine according to the invention, in which the actuating motor 1101 is arranged with its axis horizontal and operates a reducer 1102, the horizontal shaft of which supports a flat member 1102a to which two pins 1102b arranged at 180° with respect to each other are constrained.

One end of a connecting rod 1104a, 1104b is pivotably mounted on each pin 1102b, the other end thereof being respectively joined to:

the rod 105a connected to one 4a of the two half-moulds 4a, 4b of the mould 4;

a column 1100 for transmission to a rod 105b connected to the other 4b of the two half-moulds 4a, 4b.

It can be seen how this second configuration allows basically the actuating devices of the two half-moulds to be simplified, while the means for adjusting the distance of the two half-moulds from the fixed axis of symmetry remain unchanged.

It should be understood that the preceding is merely a detailed description of one embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A machine for moulding containers (3a) made of plastic material, comprising an assembly (2) for extruding tubes (3) of plastic material, a blowing assembly (5), a mould for containing containers (3a) formed by two half-moulds (4a, 4b) movable upon actuation of associated first means (100), in a longitudinal direction (X—X) and symmetrically with respect to a fixed axis (Z—Z) perpendicular to said longitudinal direction, the assembly formed by the mould (4) and the associated first actuated means (100) being movable, upon actuation of second actuating means (200), in a transverse direction (Y—Y) from a position corresponding to the extrusion assembly to a position corresponding to the blowing assembly and vice versa, said first means for actuation of the half-moulds (4a, 4b) in the longitudinal direction are of the electric type, and means (110) for symmetrically adjusting the distance of the two half-moulds (4a, 4b) from said fixed axis (Z—Z), wherein said means (110) for adjusting the relative distance of the two half-moulds (4a, 4b) comprise a sleeve (112) which is parallel to the longitudinal direction (X—X) and a first end of which is joined to the rod (105b) actuating the front carriage (106b) and the other end of which is constrained to the base of the said carriage (106b) by means of a screw/internal thread coupling (112a).

2. The machine of claim 1, wherein said first means (100) for moving the two half-moulds comprises an electric motor (101a), and a shaft coupled to the motor (101a) and joined to a transmission assembly connected to associated carriages (6a, 6b) carrying the two half-moulds.

3. The machine of claim 2, wherein said transmission assembly comprises at least two rods (105a, 105b) connected respectively to the said carriages (106a, 106b) and to respective connecting rods (104a, 104b; 1104a, 1104b).

4. The machine of claim 3, wherein said connecting rods (104a, 104b; 1104a, 1104b) are located opposite each other in the longitudinal direction (X—X).

5. The machine of claim 3, wherein said connecting rods (104a, 104b) have an axis of rotation parallel to the axis of symmetry (Z—Z) and are actuated by a gear (103) on which they are pivotably mounted and which is rotationally moved by the said drive shaft (101a).

6. The machine of claim 3, wherein said connecting rods (1104a, 1104b) are actuated by a flat member (1102a) joined to the shaft of a reducer (1102).

7. The machine of claim 6, wherein said flat member (1102a) rotates about a horizontal axis.

8. The machine of claim 6, wherein said motor (1101) actuating the reducer (1102) has an axis parallel to the direction (X—X) of displacement of the two half-moulds (4a, 4b).

9. The machine of claim 2, wherein said first actuating means (100) are mounted on a slide (120) movable in the longitudinal direction on associated fixed rails (121).

10. The machine of claim 9, wherein said means (110) for adjusting the relative distance of the two half-moulds (4a, 4b) are arranged in between said slide (120) and the front carriage (106b).

11. The machine of claim 1, wherein said sleeve (112) has, passing through it, a splined shaft (113) extending parallel to the longitudinal axis of the machine.

12. The machine of claim 11, wherein a screw/internal thread coupling (122a) is provided at the rear end of the splined shaft (112), between the said splined shaft and a support (122) in turn joined to said slide.

13. The machine of claim 3, wherein the pitch of the front screw/internal thread coupling (122a) is double the pitch of the rear screw/internal thread coupling (122a) and the two couplings operate in the opposite sense to each other.

14. The machine of claim 11, wherein the front end of the splined shaft (113) is provided with a hexagonal member (113a) for actuation of the said shaft.

15. The machine of claim 1, wherein said second means (200) for actuating the moulding assembly (4) in the transverse direction are of the electric type.

16. The machine of claim 15, wherein said second means (200) for actuating the mould (4) in the transverse direction consist of a motor reducer unit (210, 210a) connected to a movement transmission assembly.

17. The machine of claim 16, wherein said transmission assembly comprises a connecting rod (211), the small end of which is pivotably mounted on the shaft (210a) of the reducer and the big end of which is pivotably mounted on the first end of a rod (212), the other end of which is pivotably mounted on the mould-support assembly.

18. The machine of claim 17, wherein the rod (212) is interrupted and its continuity is restored by means of a sleeved joint (213), the ends of which are coupled to the respective rod portions (212) by means of a screw/internal thread coupling operating in the opposite sense.

\* \* \* \* \*